US012320275B2

(12) United States Patent
Bour et al.

(10) Patent No.: US 12,320,275 B2

(45) Date of Patent: Jun. 3, 2025

(54) STATOR VANE ASSEMBLY FOR AN AIRCRAFT TURBINE ENGINE COMPRESSOR

(71) Applicant: SAFRAN AERO BOOSTERS, Herstal (BE)

(72) Inventors: Théo Robin Thomas Bour, Herstal (BE); Matthieu Edouard Henri Droeller, Herstal (BE); Christophe Joseph Richard Gillain Remy, Herstal (BE)

(73) Assignee: SAFRAN AERO BOOSTERS, Herstal (BE)

(*) Notice: Subject to any disclaimer, the term of this patent is extended or adjusted under 35 U.S.C. 154(b) by 0 days.

(21) Appl. No.: 18/263,943

(22) PCT Filed: Jan. 31, 2022

(86) PCT No.: PCT/EP2022/052240

§ 371 (c)(1),
(2) Date: Aug. 2, 2023

(87) PCT Pub. No.: WO2022/167373

PCT Pub. Date: Aug. 11, 2022

(65) Prior Publication Data

US 2024/0117747 A1 Apr. 11, 2024

(30) Foreign Application Priority Data

Feb. 2, 2021 (BE) .................................. 2021/5074

(51) Int. Cl.
*F01D 9/04* (2006.01)
*F01D 11/00* (2006.01)

(52) U.S. Cl.
CPC ............ *F01D 9/042* (2013.01); *F01D 9/041* (2013.01); *F01D 11/005* (2013.01); *F05D 2230/60* (2013.01); *F05D 2240/125* (2013.01)

(58) Field of Classification Search
CPC ..... F01D 9/00; F01D 9/02; F01D 9/04; F01D 9/041; F01D 9/042; F01D 9/044;
(Continued)

(56) References Cited

U.S. PATENT DOCUMENTS 3,778,184 A 12/1973 Wood
4,861,229 A * 8/1989 Halstead ................ F01D 9/042 415/138

(Continued)

FOREIGN PATENT DOCUMENTS

| | | | |
|---|---|---|---|
| EP | 2 093 383 | A1 | 8/2009 |
| EP | 2 799 721 | B1 | 11/2014 |
| FR | 2 950 116 | A1 | 3/2011 |

OTHER PUBLICATIONS

FR2950116A1_MachineTranslation (Mons, M.) Mar. 18, 2011. [retrieved on Feb. 22, 2024] Retrieved from: Espacenet. (Year: 2011).*

(Continued)

*Primary Examiner* — Elton K Wong
(74) *Attorney, Agent, or Firm* — CHRISTENSEN O'CONNOR JOHNSON KINDNESS PLLC

(57) ABSTRACT

A stator vane assembly for a compressor of an aircraft turbine engine includes an inner shroud, an outer shroud, and stator vanes. The stator vanes are attached only to the inner shroud and are in non-immobilizing mechanical contact with the outer shroud.

12 Claims, 6 Drawing Sheets

(58) Field of Classification Search
CPC .. F01D 11/00; F01D 11/005; F05D 2240/125; F05D 2260/30; F05D 2230/60; F04D 29/54; F04D 29/541; F04D 29/542
See application file for complete search history.

(56) References Cited

U.S. PATENT DOCUMENTS

| | | | | |
|---|---|---|---|---|
| 2002/0127097 | A1* | 9/2002 | Darolia | F01D 9/042 415/137 |
| 2013/0205800 | A1* | 8/2013 | Ivakitch | F01D 11/005 29/888.025 |
| 2018/0149026 | A1* | 5/2018 | Vetters | F01D 5/3007 |
| 2021/0348516 | A1* | 11/2021 | Freeman | F01D 9/044 |

OTHER PUBLICATIONS

International Search Report mailed May 3, 2022, issued in corresponding International Application No. PCT/EP2022/052240, filed Jan. 31, 2022, 5 pages.
Written Opinion mailed May 3, 2022, issued in corresponding International Application No. PCT/EP2022/052240, filed Jan. 31, 2022, 5 pages.

* cited by examiner

STATOR VANE ASSEMBLY FOR AN AIRCRAFT TURBINE ENGINE COMPRESSOR

TECHNICAL FIELD

The present invention relates to an aircraft turbine engine compressor.

BACKGROUND

It is known, for example from the document EP2799721B1, that the stator vanes of a stator vane assembly (or of a rectifier assembly) of an aircraft turbine engine compressor can be attached to a shroud located radially on the outside, referred to as the external shroud. This document also describes auxiliary vanes (or blades), which are elements located between the stator vanes and having a radial height of between 10% and 50% of the radial height of the stator vanes (or stator blades).

The document U.S. Pat. No. 3,778,184 A describes a compressor in which a damping of the vanes is carried out by surrounding one end of the vane with a damping material of the steel wool or metal felt type held in contact with the fairing.

The document EP 2 093 383 A1 describes a compressor in which the stator vanes are attached to the internal shroud.

SUMMARY OF THE INVENTION

The external shroud is subject to considerable mechanical stresses, particularly in turbine engine architectures where it is located in the main force path of the thrust. Some of these mechanical stresses originate from the stator vanes attached to this external shroud.

One object of the present invention is to reduce the mechanical stresses in an aircraft turbine engine.

To this end, the invention proposes a stator vane assembly (or a rectifier assembly) for a compressor for an aircraft turbine engine, comprising:

an internal shroud, an external shroud, and stator vanes (or stator blades), wherein the stator vanes are attached only to the internal shroud and are in non-immobilizing mechanical contact with the external shroud;

wherein the external shroud comprises a groove receiving radially external ends of the stator vanes;

characterised in that the groove extends axially to a downstream end of the external shroud.

In the invention, the stator vanes are attached only to the internal shroud, which allows to avoid the places where mechanical stresses are concentrated on the external shroud. The contact with the external shroud is non-immobilising, i.e. it does not involve immobilising the stator vanes in relation to the external shroud. We could use the expression "free mechanical contact" or "non-attaching mechanical contact" instead of "non-immobilising mechanical contact". In other words, there is no element on the external end of the vane to immobilise it on the external shroud. Such a contact avoids a force transmission between the vane and the external shroud via the radially external end of the vane, while also avoiding air leakage between the external shroud and the radially external end of the vane.

In addition, in the invention, the groove in the external shroud, which extends axially as far as a downstream end of the external shroud, allows the mounting of the vanes particularly easily.

In the prior art, the internal shroud is attached to the other elements of the turbine engine via the stator vanes and the external shroud, so the person skilled in the art would not think of removing the attachment to the external shroud. In the invention, the internal shroud is designed to be attached to the other elements of the turbine engine by other means. These means are preferably more rigid than in the prior art (generally constrained supports). The force transmission chain (turbine engine/internal shroud/vane) is therefore more rigid than in the prior art.

It is interesting to note that, in the invention, it is the vanes, which have a mechanical contact (direct or indirect) with each of the two shrouds, which are attached to the internal shroud, and not auxiliary vanes as described in EP2799721B1. In fact, the latter have mechanical contact with only one of the two shrouds. In addition, they complement the stator vanes in order to prevent the flux from stalling on the stator vanes: they are not intended to replace the stator vanes.

In one embodiment, the stator vanes are welded to the internal shroud. The weld allows an attachment particularly strong. Another attachment, such as bolting and/or riveting, are possible but remain within the scope of the invention.

In one embodiment, the external shroud comprises a sealing element of a flexible material in contact with radially external ends of the stator vanes. The sealing element allows to prevent the leakage between the radially external ends of the stator vanes and the external shroud. The flexible material preferably has a Young's modulus of less than 10 GPa. The flexible material may be silicone, for example. The sealing element is preferably at least partially in the groove. The sealing element may comprise several separate parts, while remaining within the scope of the invention.

According to one embodiment, the sealing element is located, at least partly, at a radially external position relative to the radially external ends of the stator vanes and extends, at least partly, axially along the radially external ends of the stator vanes. The radially external ends of the stator vanes can slide over the sealing element while remaining in contact with it.

In one embodiment, the sealing element comprises a seal. The seal is preferably located at an upstream or downstream end of the groove. The radially external ends abut against it.

In one embodiment, the stator vanes comprise, at their radially external end, a platform extending downstream. A sealing element in the form of a seal is particularly advantageous in this case.

In one embodiment, the internal shroud is in one piece. In another embodiment, the internal shroud is made up of a plurality of sectors forming a ring.

The invention further proposes an aircraft turbine engine comprising a first compressor comprising a stator vane assembly according to one embodiment of the invention. The first compressor can be, for example, the low-pressure compressor or the high-pressure compressor of the turbine engine. In an aircraft turbine engine comprising the invention, the relative positioning of the external shroud with respect to the internal shroud does not use the vane but by one or more elements of the turbine engine outside to the stator vane assembly.

The invention is particularly suited to a turbine engine comprising a gearbox between the shaft and the fan, as the presence of the latter generates particularly high mechanical stresses on the external shroud.

In one embodiment, the turbine engine comprises a second compressor downstream of the first compressor. In this specific embodiment, the more upstream of the two compressors comprises the stator vane assembly according to the invention.

In one embodiment, the stator vanes attached solely to the internal shroud and in non-immobilising mechanical contact with the external shroud are the stator vanes furthest downstream of the first compressor. This allows to make it easier to attach the internal shroud downstream of the first compressor than if the internal shroud to which the stator vanes are attached were axially in the middle of the first compressor.

According to one embodiment, the turbine engine comprises an intermediate support casing located, preferably directly, downstream of the first compressor, the internal shroud being attached to the intermediate support casing or being in one piece with the intermediate support casing. This makes the attachment of the internal shroud particularly easy and strong. The invention also relates to an assembling comprising the intermediate support casing and the stator vane assembly.

In one embodiment, the external shroud is attached to the intermediate support casing.

The invention also proposes an aircraft comprising a turbine engine according to the invention.

The invention further proposes a method for manufacturing a stator vane assembly, comprising the steps of:

attaching the stator vanes to the internal shroud, positioning the stator vanes in relation to the external shroud, and creating a non-immobilising mechanical contact between the stator vanes and the external shroud, preferably by forming a sealing element at the junction between the stator vanes and the external shroud.

BRIEF DESCRIPTION OF THE FIGURES

Further characteristics and advantages of the invention will become apparent from the following detailed description, for the understanding of which reference is made to the appended figures, among which.

EMBODIMENTS OF THE INVENTION

The present invention is described with particular embodiments and references to figures but the invention is not limited thereby. The drawings or figures described are only schematic and are not limiting. In addition, the functions described may be carried out by structures other than those described in this document.

In the context of this present document, the terms "first" and "second" are used only to differentiate the various elements and do not imply an order between these elements.

In the figures, the identical or similar elements may have the same references.

Figure 1:
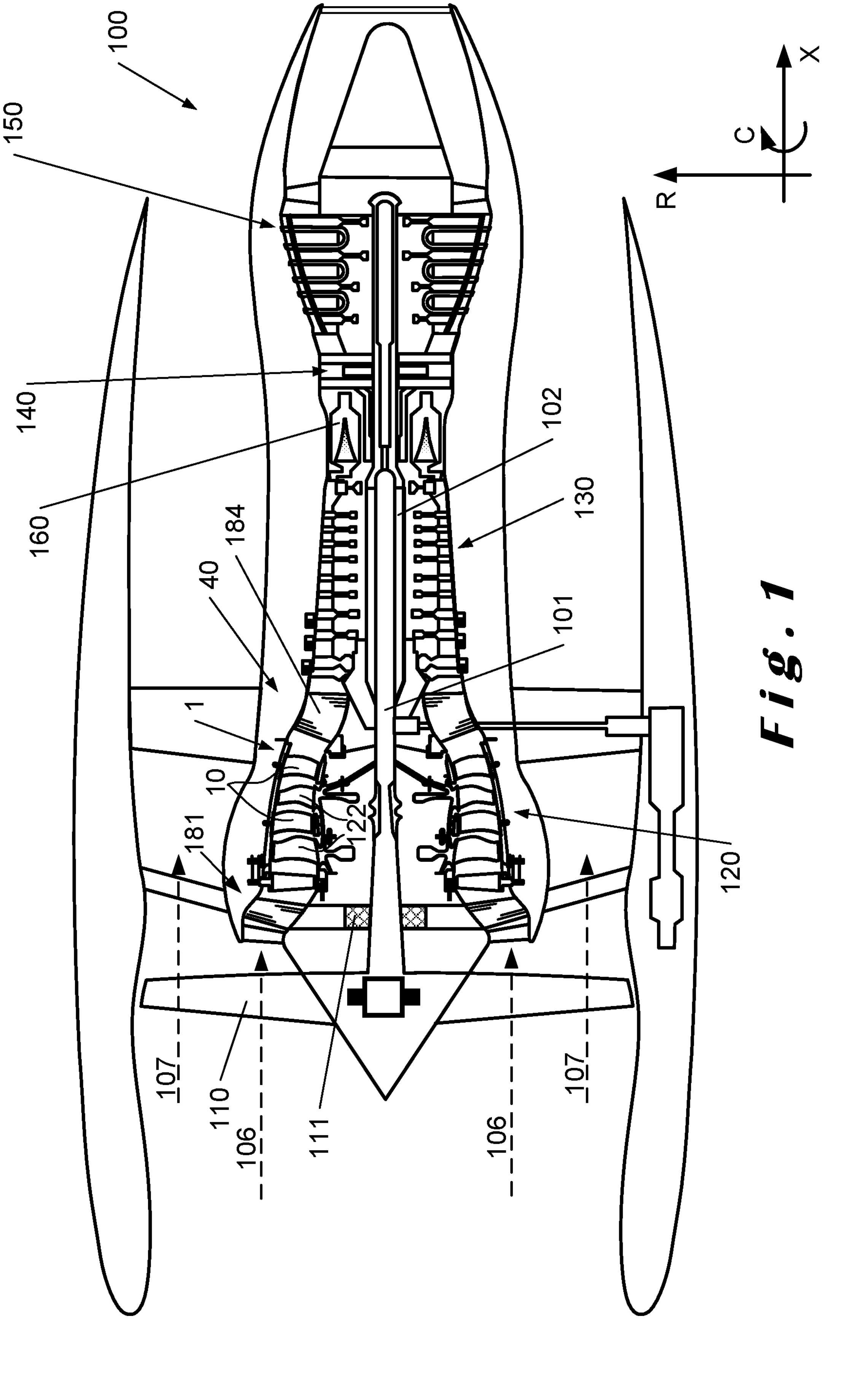
FIG. 1 is an axial cross-section of a turbine engine according to one embodiment of the invention.

FIG. 1 illustrates an aircraft turbine engine 100 which may comprise a stator vane assembly 1 according to the invention. It can also be referred to as a "stator assembly". The aircraft turbine engine 100 is, for example, an axial double flow turbine engine comprising, in succession along the engine axis X, a fan 110, a first compressor 120 (or low-pressure compressor), a second compressor 130 (or high-pressure compressor), a combustion chamber 160, a high-pressure turbine 140 and a low-pressure turbine 150. In operation, the mechanical power of the low-pressure 150 and high-pressure 140 turbines is transmitted via shafts 101 and 102 respectively to the low-pressure 120 and high-pressure 130 compressors, and to the fan 110 by means of a gearbox 111 interposed at the level of the shaft 101. The fan 110 allows to generate a primary flow 106 passing through the aircraft turbine engine 100 in a primary aerodynamic duct and a secondary flow 107 outwardly around the compressors 120, 130 and the turbines 140, 150.

The first compressor 120 is equipped with at least one row of rotor vanes 122 followed directly downstream by a row of stator vanes 10, each row of stator vanes 10 forming a stator vane assembly 1. The invention may apply to any or all of the stator vane assemblies of the first compressor 120, and in particular to the stator vane assembly furthest downstream of the first compressor 120.

The aircraft turbine engine 100 comprises an inlet support casing 181 which extends around the inlet of the primary duct (through which the primary flow 106 passes), downstream of the fan 110. The aircraft turbine engine 100 also comprises an intermediate support casing 40 which extends circumferentially between the first 120 and second 130 compressors. This intermediate support casing 40 comprises an annular sleeve, preferably with a gooseneck profile, delimiting the primary aerodynamic duct between the first 120 and second 130 compressors. It is preferably equipped with structural arms 184 extending radially across the primary duct.

Figure 2:
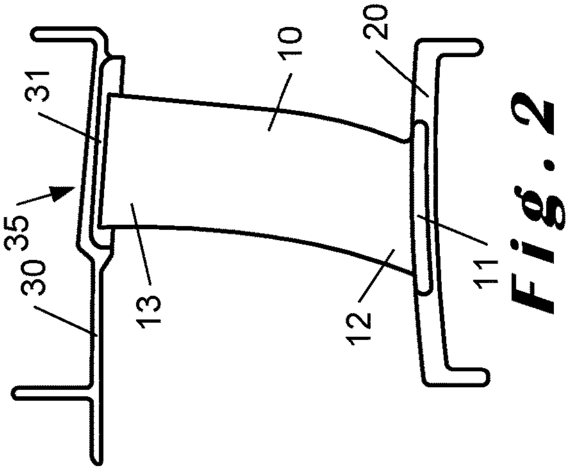
FIG. 2 illustrates a stator vane according to one embodiment of the invention.

FIG. 2 illustrates a stator vane 10 of a stator vane assembly 1 according to one embodiment of the invention. The stator vane 10 is attached, preferably by a weld 11, at its radially internal end 12, to an internal shroud 20. The attachment between the stator vane 10 and the internal shroud 20 prevents any relative movement. The stator vane 10 is in non-immobilising mechanical contact, for example via a sealing element 31, at its radially external end 13, with an external shroud 30. In one embodiment of the invention, the sealing element 31 is located, at least partially, in a groove 35, preferably circumferential, in the external shroud 30. The groove 35 preferably receives the radially external ends 13 of all the stator vanes 10 of the stator vane assembly 1.

Figure 3A:
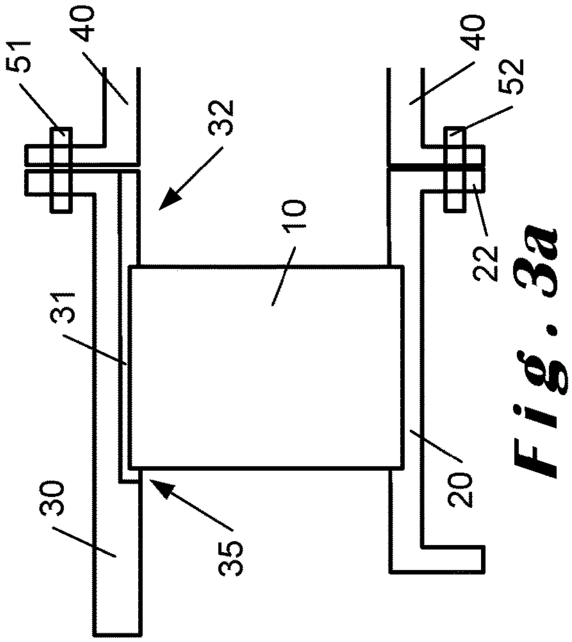
FIGS. 3*a* to 3*c* illustrate three embodiments of the invention.
Figure 3B:
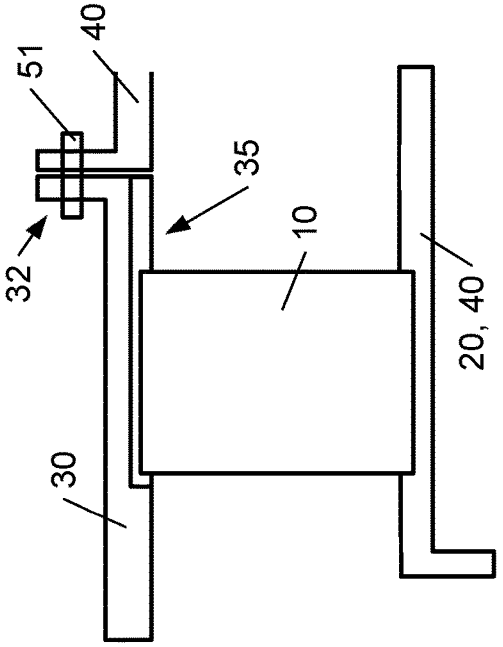
Figure 3C:
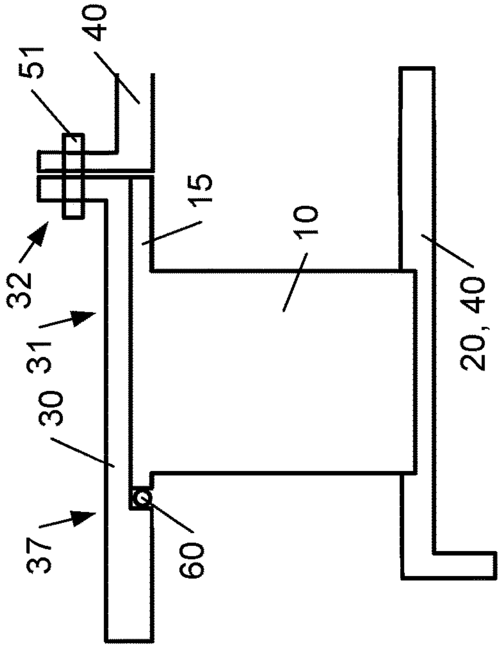
Figure 4:
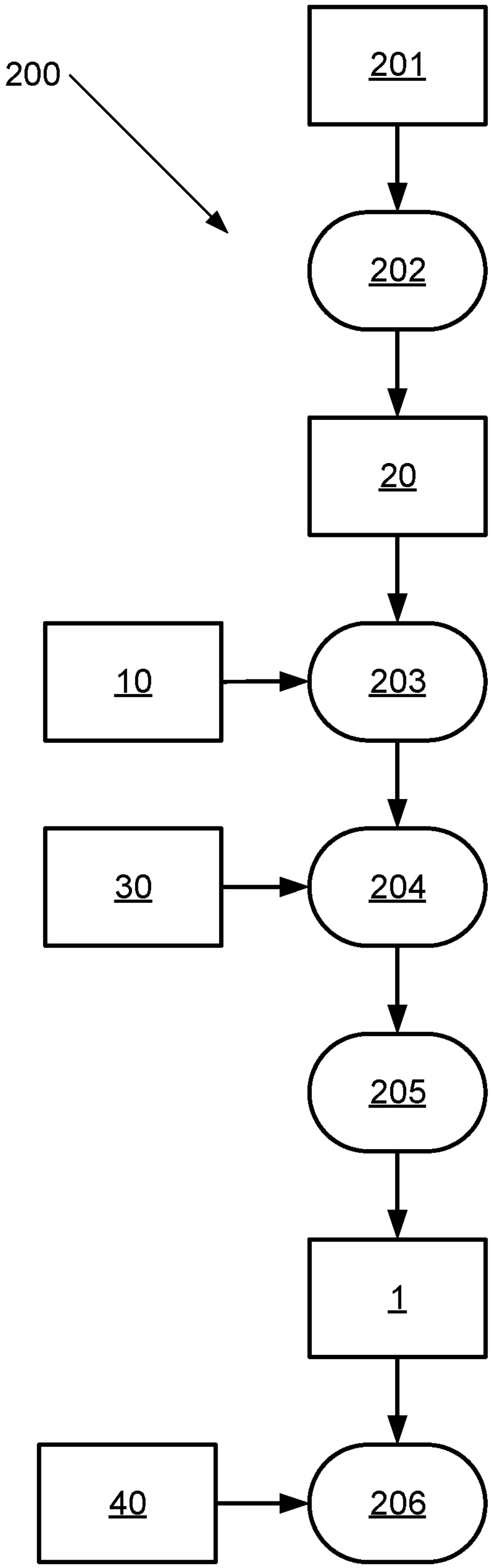
FIG. 4 is a flow diagram of a method for manufacturing a stator vane assembly according to one embodiment of the invention.

FIGS. 3*a* to 3*c* illustrate three embodiments of the invention, which differ, on the one hand, in the attachment of the internal shroud 20 to the intermediate support casing 40 and, on the other hand, in the mechanical coupling between the stator vane 10 and the external shroud 30. The person skilled in the art will understand that all the ways of attaching the internal shroud 20 to the intermediate support casing 40 are compatible with all the mechanical couplings between the stator vane 10 and the external shroud 30.

As shown in FIG. 3*a*, the groove 35 extends to the downstream end 32 of the external shroud 30. It is filled with a flexible material in contact with radially external ends 13 of the stator vanes 10, and forms the sealing element 31. This is located at a radially external position relative to the radially external ends 13 of the stator vanes 10 and extends axially along the radially external ends 13 of the stator vanes

10. In addition, the downstream end 22 of the internal shroud 20 is attached to the intermediate support casing 40 by attachment means 52, for example screws.

As shown in FIG. 3*b*, the groove 35 extends to the downstream end 32 of the external shroud 30. It is filled with a flexible material in contact with radially external ends 13 of the stator vanes 10, and forms the sealing element 31. This is located at a radially external position relative to the radially external ends 13 of the stator vanes 10 and extends axially along the radially external ends 13 of the stator vanes 10. In addition, the downstream end 22 of the internal shroud 20 is in one piece with the intermediate support casing 40.

As shown in FIG. 3*c*, the groove 35 extends to the downstream end 32 of the external shroud 30. A seal 60, for example an o-ring, is located at an upstream end 37 of the groove 35. The upstream end of the stator vane 10 abuts against it. It forms the sealing element 31. In addition, the stator vane 10 comprises, at its radially external end 13, a platform 15 extending downstream and abutting against the external shroud 30. In addition, the downstream end 22 of the internal shroud 20 is in one piece with the intermediate support casing 40.

In the three embodiments illustrated in FIGS. 3*a*-3*c*, the downstream end 32 of the external shroud 30 is attached to the intermediate support casing 40 by attachment means 51, for example screws. In addition, the downstream end 22 of the internal shroud 20 is attached to the intermediate support casing 40 or is integral with it. Consequently, in these three embodiments, the positioning of the internal shroud 20 relative to the external shroud does not stress the junction between the stator vanes 10 and the external shroud 30 because this junction allows a relative displacement. The internal shroud 20 is positioned relative to the external shroud 30, which absorbs the structural and operating forces of the turbine engine, by joining the internal shroud 20 with respect to the intermediate support casing 40 and to the intermediate support casing 40 with respect to the external shroud 30.

FIGS. 4, 5*a* to 5*d* and 6 illustrate certain steps in a method 200 for manufacturing a stator vane assembly 1 according to the invention, and for assembling it with the intermediate support casing 40.

A block of metal 201, for example titanium, is machined 202 to form the internal shroud 20, preferably with holes 301 for attachment means 52. The internal shroud is then attached 203 to the stator vanes 10 (FIG. 5*a*). Inserts 302 (visible in FIGS. 5*b* and 6 in particular) are preferably inserted into the holes 301.

Figure 5B:
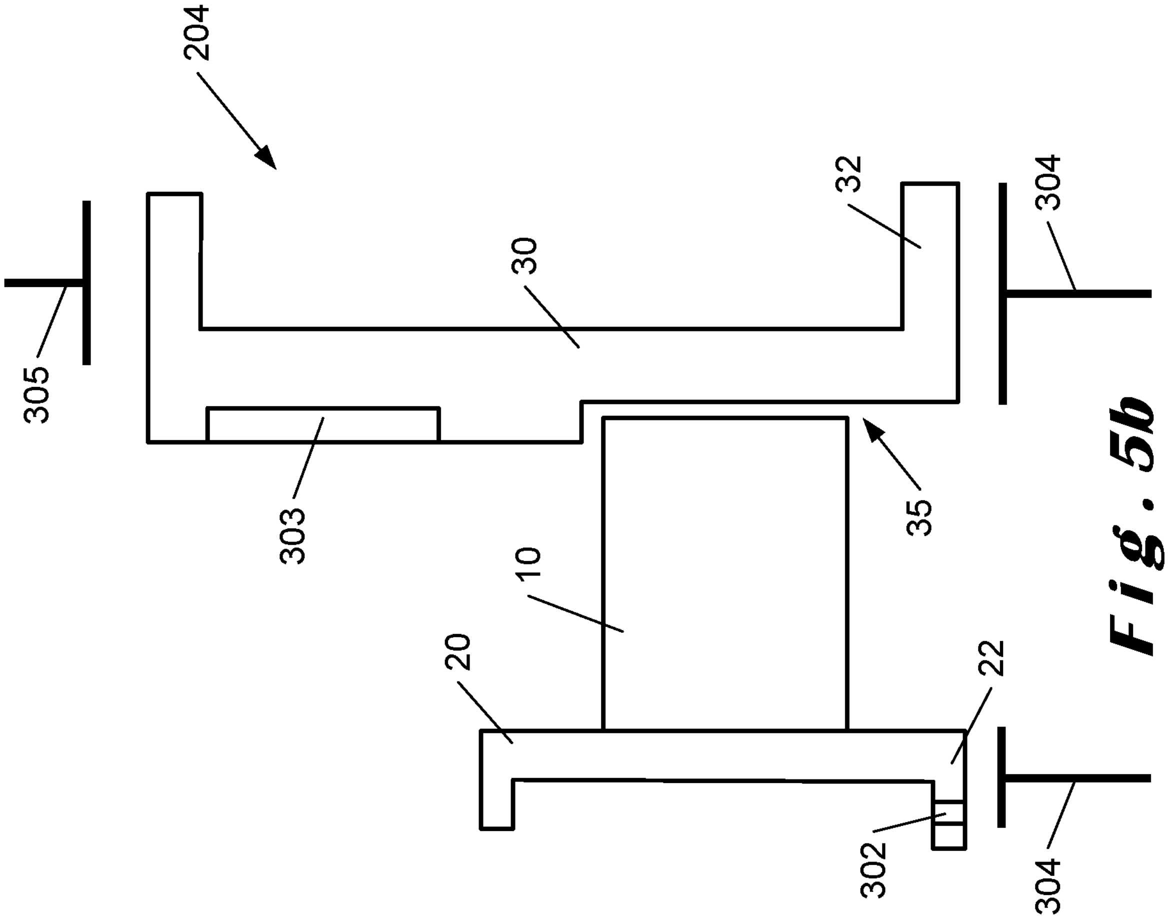
FIGS. 5*a* to 5*d* illustrate steps in this method for an annular external shroud.
Figure 5A:
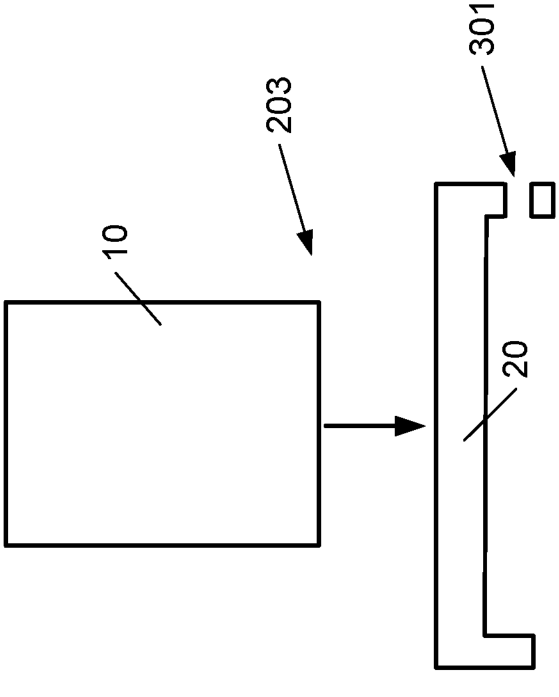
Figure 5D:
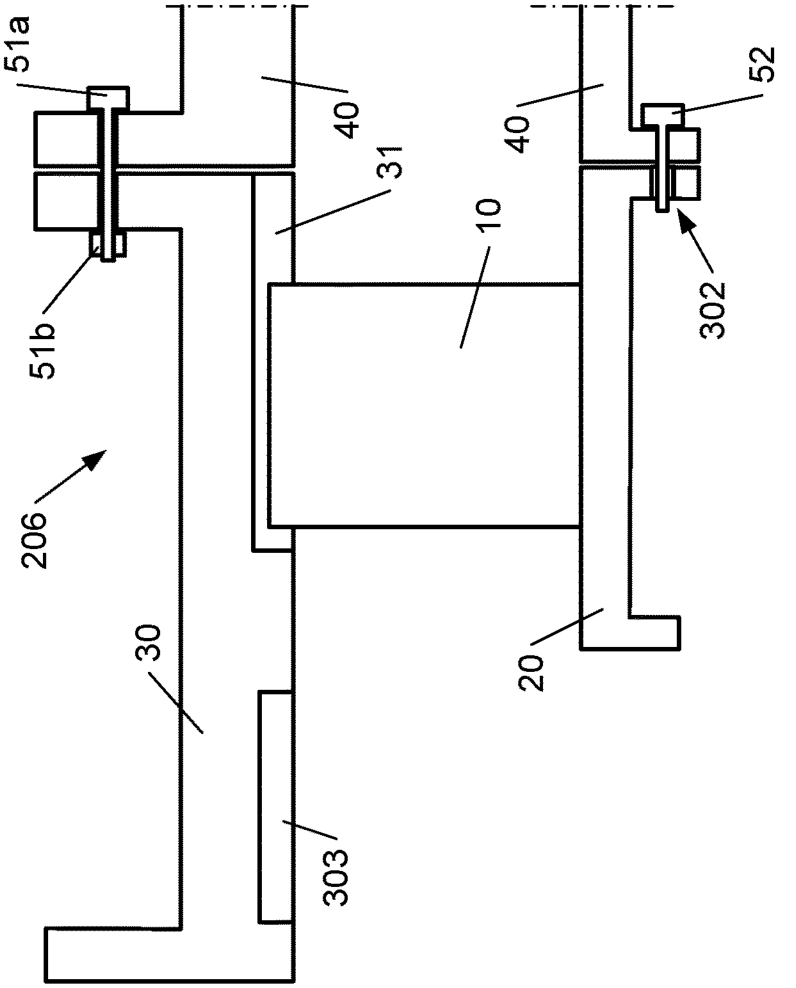
Figure 5C:
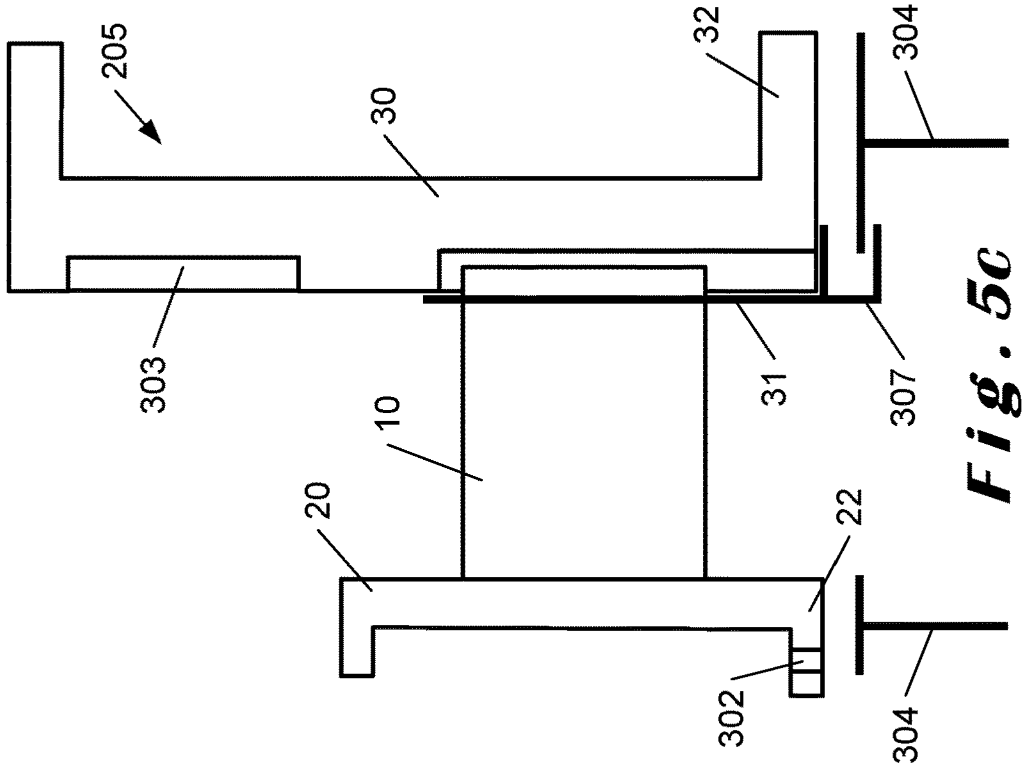
Figure 6:
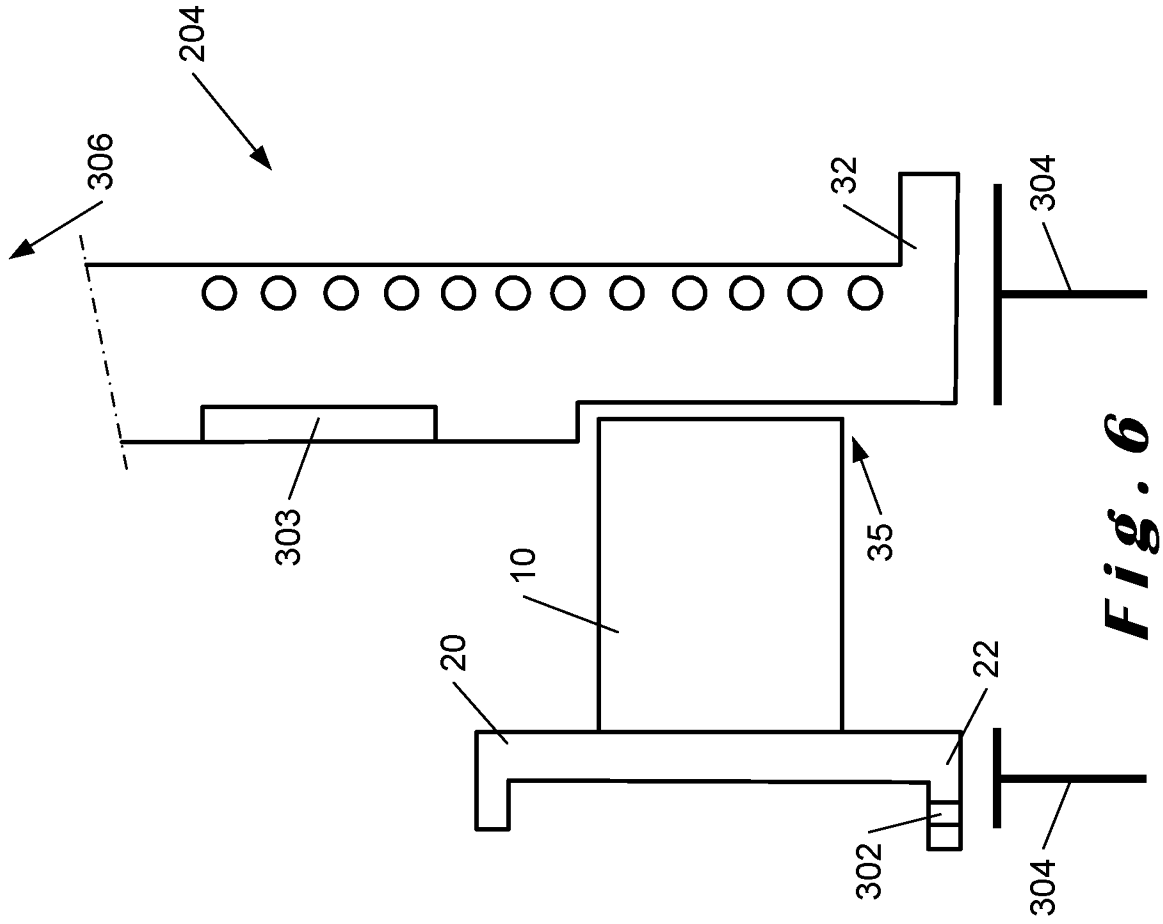
FIG. 6 is the equivalent of FIG. 5*b* for a half-shell external shroud.

Then the stator vanes 10 and the external shroud 30 are positioned 204 so as to leave a space between them which will be filled with a suitable material for a non-immobilising mechanical contact (FIGS. 5*b* and 6). This positioning is preferably such that the downstream end 32 of the external shroud 30 and the downstream end 22 of the internal shroud 20 are located lower than the stator vanes 10 and rest on a support tooling 304. The abradable 303 of the external shroud 30 is then preferably located higher than the stator vanes 10. FIG. 5*b* shows a diagram of a lifting tool 305 allowing to lift the annular external shroud 30. The arrow 306 in FIG. 6 indicates that the radial flange of the half-shell external shroud 30 is located higher.

The material suitable for a non-immobilising mechanical contact is then deposited 205 at the junction between the stator vanes 10 and the external shroud 30, for example using a mould 307, which is preferably such that said material does not adhere to it. The mould 307 can be attached to the support tooling 304. The result is a stator vane assembly 1, which is turned over and assembled 206 to the intermediate support casing 40. The attachment means 51 may comprise screws 51*a* and nuts 51*b*.

The present invention has been described above in connection with specific embodiments, which are illustrative and should not be considered limiting. In a general manner, the present invention is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

The invention claimed is:

1. An aircraft turbine engine comprising a first compressor having a stator vane assembly comprising:

an internal shroud, an external shroud, and stator vanes, wherein the stator vanes are attached only to the internal shroud and are in non-immobilizing mechanical contact with the external shroud;

wherein the external shroud comprises a groove receiving radially external ends of the stator vanes;

wherein the groove extends axially to a downstream end of the external shroud.

2. The aircraft turbine engine according to claim 1, comprising a second compressor, downstream of the first compressor.

3. The aircraft turbine engine according to claim 1, wherein the stator vanes of said stator vane assembly are the furthest downstream stator vanes of the first compressor.

4. The aircraft turbine engine according to claim 3, comprising an intermediate support casing located downstream of the first compressor, the internal shroud being attached to the intermediate support casing or being in one piece with the intermediate support casing.

5. The aircraft turbine engine according to claim 4, wherein the external shroud is attached to the intermediate support casing.

6. The aircraft turbine engine according claim 4, wherein the intermediate support casing is located directly downstream of the first compressor.

7. The aircraft turbine engine according to claim 1, wherein the external shroud further comprises a sealing element of a flexible material in contact with radially external ends of the stator vanes.

8. The aircraft turbine engine according to claim 7, wherein the stator vanes are welded to the internal shroud.

9. The aircraft turbine engine according to claim 7, wherein the sealing element is at least partly located at a radially external position relative to the radially external ends of the stator vanes and at least partly extends axially along the radially external ends of the stator vanes.

10. The aircraft turbine engine according to claim 7, wherein the sealing element comprises a seal.

11. The aircraft turbine engine according to claim 7, wherein the internal shroud is in one piece or is made up of a plurality of sectors forming a ring.

12. An aircraft comprising a turbine engine according to claim 1.

* * * * *